United States Patent [19]

Shepherd

[11] Patent Number: 5,031,482
[45] Date of Patent: Jul. 16, 1991

[54] SAW CHAIN GRINDING MACHINE

[76] Inventor: James E. Shepherd, 1231 Dutton Rd., Eagle Point, Oreg. 97524

[21] Appl. No.: 451,949

[22] Filed: Dec. 18, 1989

[51] Int. Cl.⁵ .............................................. B23D 63/16
[52] U.S. Cl. ......................................... 76/37; 76/80.5
[58] Field of Search .................... 76/80.5, 78.1, 37, 40

[56] References Cited

U.S. PATENT DOCUMENTS

| Re. 28,057 | 7/1974 | Silvey | 76/43 |
| 2,410,828 | 11/1946 | Lofstrand, Jr. | 76/80.5 |
| 2,459,233 | 1/1949 | Mall | 76/80.5 |
| 3,779,103 | 12/1973 | Silvey | 76/40 |
| 4,836,058 | 6/1989 | Shepherd | 76/25 |

Primary Examiner—Roscoe V. Parker
Attorney, Agent, or Firm—Eugene M. Eckelman

[57] ABSTRACT

An adjustable holder for a chisel-bit type saw chain is arranged to hold cutter elements of the chain adjacent the grinding edge of a grinding wheel for sharpening the cutter elements wherein the angle of grind can be adjusted. For this purpose, the chain holder has pivotal support on a base with a radius directed to the grinding point of the grinding wheel. Also, the holder supports the cutter elements such that their pivot support is at the grinding point. No other adjustments of the motor and grinding wheel assembly or the chain holder is necessary.

9 Claims, 2 Drawing Sheets

SAW CHAIN GRINDING MACHINE

BACKGROUND OF THE INVENTION

This invention relates to new and useful improvements in saw chain grinding machines.

Saw chains now in use have right and left cutter elements on alternate cutter links. A common cutter element comprises the chisel-bit type chain. This cutter element has an L-shaped cutting edge with a working corner that severs the crossgrain. A chisel edge leads rearwardly from this cutting edge at a selected angle. This angle preferably is of selected degree depending on the type of wood being cut, namely, the softer the wood the steeper the angle of this edge. Prior devices, such as shown in U.S. Pat. No. Re. 28057 are known which have structure that varies the relative angle between the axis of the chain support and the axis of the grinding wheel. This is done by adjusting the angle of tilt of the motor and grinder assembly. When this is done, still other adjustments are required to bring the cutter elements back into the correct position to be ground. These further adjustments are required since the pivot of the motor and grinding wheel assembly is not at the grinding point.

The oppositely directed cutter elements of saw chains require grinding from opposite directions, and if a smooth and fast cut is desired, the right and left cutter elements must all be ground uniformly. Prior devices have been conceived that seek uniform engagement of the opposite cutter elements with the grinding wheel as by symmetrical side holders for the chain or swinging arm mechanisms. Another device for uniform grinding is shown in my U.S. Pat. No. 4,836,058, wherein pivotal support means for a chain holder is provided that is parallel with the plane of the grinding wheel. This structure facilitates grinding of the oppositely facing cutter elements at the same radial point of grind on the edge of the grinding wheel, whereby by simply pivoting the holder between identical opposite angular directions, symmetrical sharpening of opposite cutter elements is accomplished without transferring the chain from one side of the wheel to the other.

SUMMARY OF THE INVENTION

According to the present invention and forming a primary objective thereof, a saw chain grinding machine is provided wherein a pivot support for the cutter elements is at the grinding point on the grinding wheel and a radius of adjustment of the chain holder is directed toward said grinding point, whereby the angle of grind of the cutter elements by the grinding wheel is accomplished simply by adjusting the chain holder For carrying out such objective, a saw chain bar or holder is provided that is adjustable relative to the grinding wheel for accomplishing a grinding function of the chisel edge portion of cutting elements for applying the desired angle of tilt to this chisel edge portion. The chain holder has pivotal adjustment with its radius of adjustment directed toward the grinding point at the edge of the grinding wheel. Also, the chain holder supports the chain in a position such that the pivot support for the cutter elements is at the grinding point. This adjustable feature is particularly applicable for use with the structure of my Pat. No. 4,836,058 wherein support means for the chain holder is parallel with the plane of the grinding wheel and comprises a pivot having an axis which passes through the grinding point and which centers the cutter elements on this axis, thus accomplishing the novel function of precision grinding opposite cutter elements at the same point on the wheel.

The invention will be better understood and additional objects and advantages will become apparent from the following description taken in connection with the accompanying drawings.

DETAILED DESCRIPTION OF A PREFERRED EMBODIMENT

Figure 2:
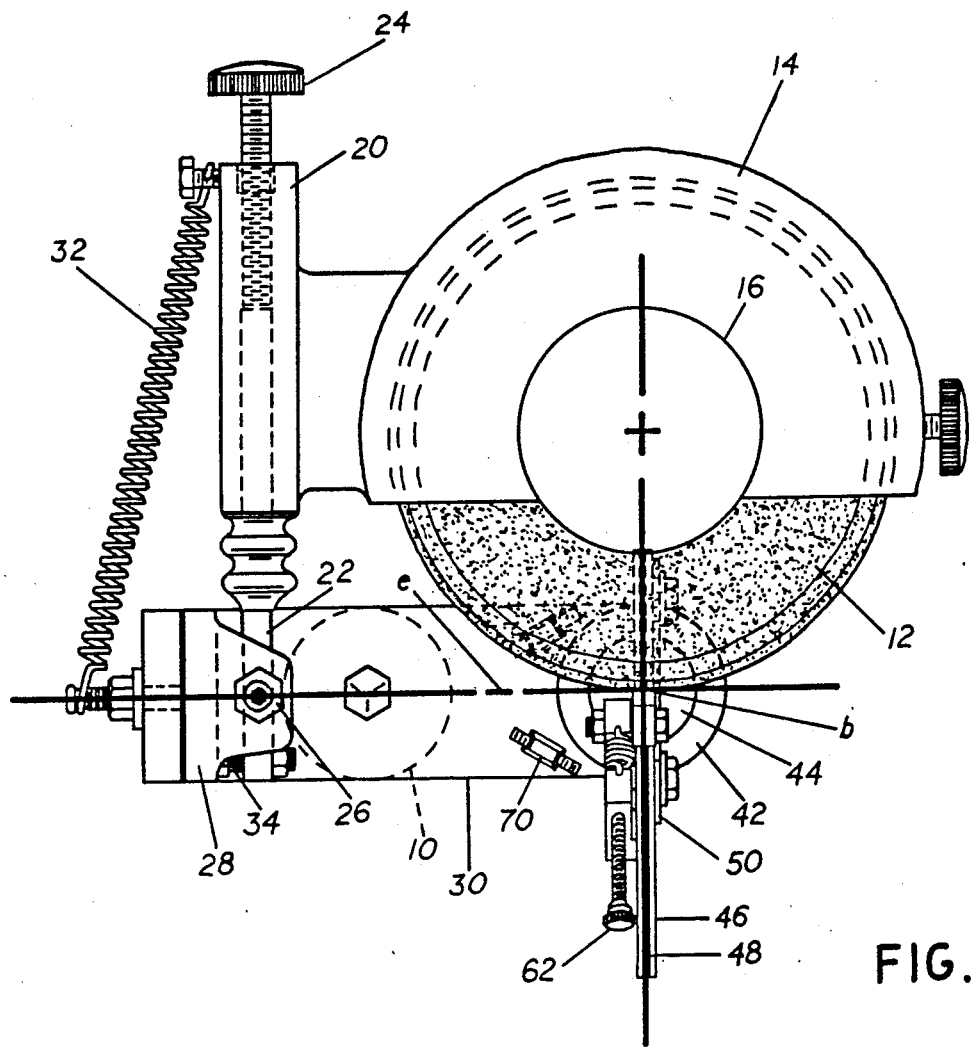
FIG. 2 is a top plan view of the machine.
Figure 3:
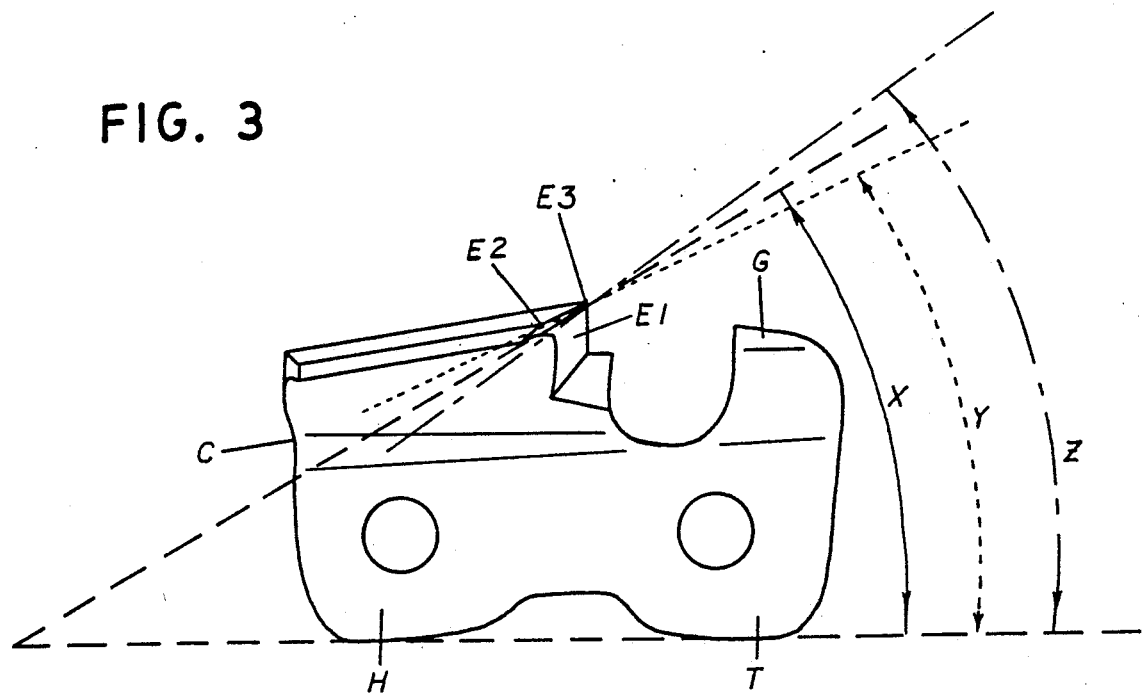
FIG. 3 is an enlarged side elevational view of a chisel-bit type cutter element and showing illustrative angles at which the chisel cutting edge may be ground.

With particular reference to the drawings, and first to FIG. 3, a representative chisel-bit type cutter element C is shown. It has the usual heel H and toe T, respectively, a depth gauge G, a chisel-shaped cutting edge E1, and a chisel or undercut edge E2 leading rearwardly from edge E1 and angled selectively according to the desire of the user. The angle of this undercut edge is conventionally changed by changing the angle of the motor and grinder assembly. Edges E1 and E2 meet in a working corner E3. The present invention is used with a saw chain grinding machine for precisely grinding this type of cutter element including the grinding of the chisel edge at selected angles. Although the invention may be used with other grinding machines, it is described herein for use with the grinding machine shown in my U.S. Pat. No. 4,836,058 but with some alterations. The basic machine of that patent comprises a machine base 10 that supports a grinding wheel 12 shielded by a guard 14. The grinding wheel is driven by a motor 16, and the motor and wheel assembly is secured to slide means 20. Slide means 20 is supported nonrotatably on an elongated body member 22 and is adjustable longitudinally of such body member by an adjusting screw 24 threadedly mounted in the end of the slide means and abutting the end of the body member 22. Screw 24 adjustably moves the motor assembly and grinding wheel to selected positions as the wheel wears. Body member 22 is supported on an upright pivot 26 of an upright extension 28 integral with a lateral bed plate 30 in turn integral with the machine base 10. The motor and grinding wheel assembly is held retracted on its pivot 26, namely, in a counterclockwise direction as viewed in FIG. 2, by a tension spring 32 connected between the slide means 20 and the bed plate This spring also holds the screw 24 in abutment with the end of body member 22. A factory installed stop screw 34 is mounted adjustably in the body member 22 and is arranged for abutment with the upright extension 28. This screw locates the leading edge of the grinding wheel selectively at the completion of a grinding step.

Bed plate 30 forms a base for a turntable 42 having an upwardly projecting extension 44. The extension 44 fixedly supports an upstanding plate-like bar or holder 46 which, similar to a chain saw bar, has an edge slot 48 in which a saw chain to be sharpened is laid with the driving tines downwardly and the cutter elements projecting upwardly from the holder. The supporting surface 42a for the turntable is parallel with the flat or surface plane of the grinding wheel 12. Also, the pivot axis a of the chain holder support 42, 44 passes through the grinding point which is designated by b. Since the supports for the chain holder and grinding wheel are parallel, the axis a of the support is parallel with the grinding wheel axis c.

Figure 1:
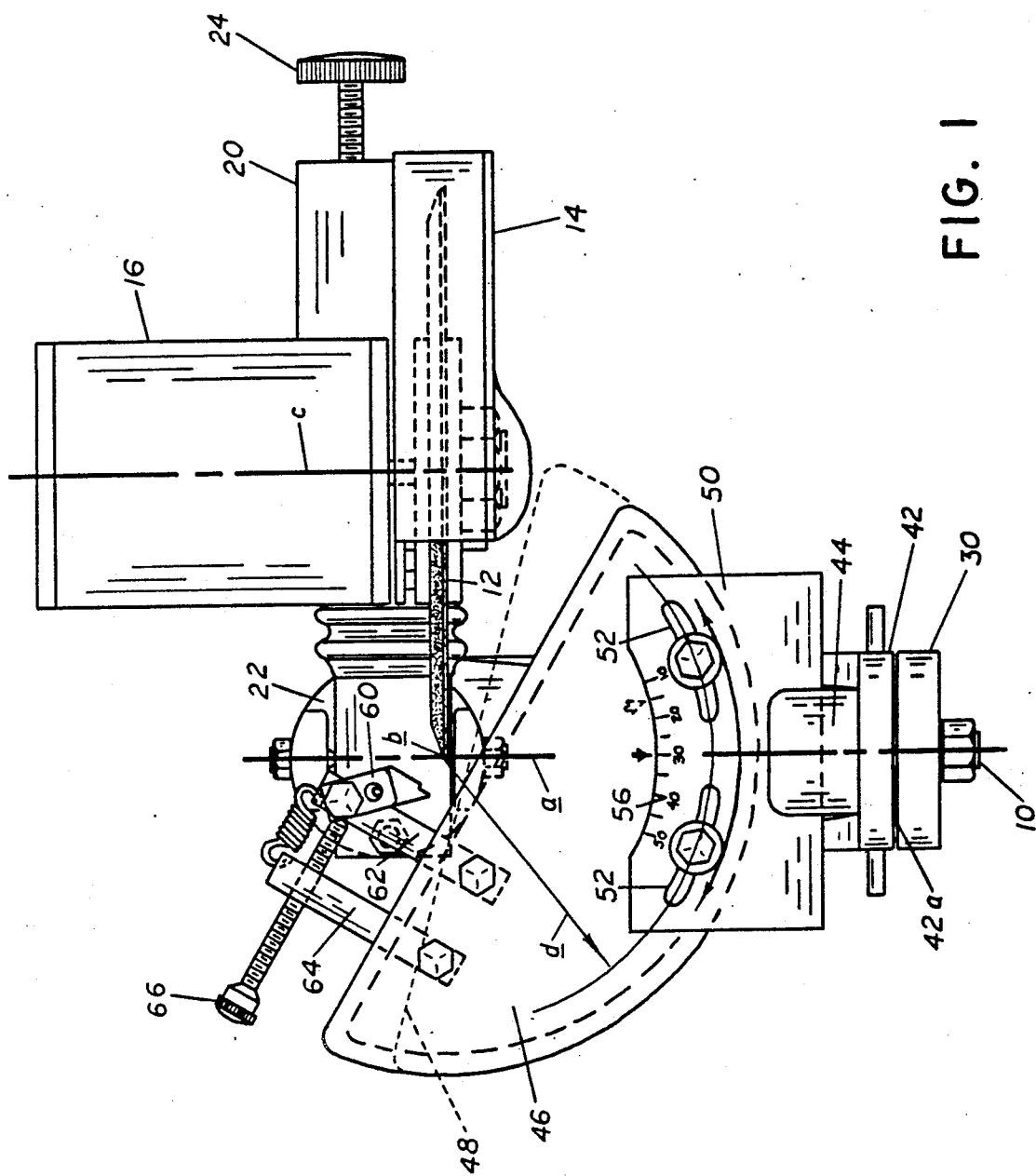
FIG. 1 is a side elevational view of a saw chain grinding machine embodying features of the present invention and showing a pair of adjusted positions of the chain holder in solid and broken lines.

For achieving the novel selected angle grinding of the chisel edge E2 of the cutter elements, chain holder 46 is plate-like in form and is supported adjustably on an upright plate-like extension 50 secured integrally to the turntable 42. Chain holder 46 extends upwardly at right angles to the grinding wheel 12 and has face-to-face adjusting movement on the extension 50 by an arcuate slot and clamp fastener adjustment 52. Importantly, the radius d of the slots 52 and thus the radius of adjusting or tilting support of the chain holder 46 is directed toward the grinding point b at the edge of the grinding wheel. The chain is supported on the holder such that the pivot support of the cutter elements is at the grinding point, whereby adjustments of the chain holder are available for positioning the holder to selected positions, for example, to the two positions of solid and dotted lines illustrated in FIG. 1, to provide a desired angle to the chisel edge E2 of the cutter elements without other adjustments. FIG. 3 illustrates even more exemplary angle values X, Y and Z that can be applied to the chisel edge E2. An angle identifying scale or indicia 56 is provided on the members 46 and 50 for selected setting of the member 46.

The grinder employs a stop pawl 60 arranged to engage the rear edge of a cutter element and hold the cutter element stationary at grinding point b as the grinding wheel moves into the cutter element during a grinding operation. This stop pawl is pivotally supported on an upright link 62 and is associated with an upright post 64 and adjusting screw 66 in a conventional manner for adjusting and holding the tooth in a selected grinding position.

In the operation of the present grinder, proper settings of the grinding wheel assembly are first made in a conventional manner, namely, a selected stop positioning of the grinding wheel as it is swung into a final grinding step providing precisely the chisel bit type shape, the adjustment of screw 24 for wheel wear, and the positioning of the stop pawl 60 for its backup of the cutter element. In this supported position of the cutter elements, the pivot axis of support of such cutter elements is at the grinding point b and the radius of support 46 is aligned with said grinding point. Thus, the angle of tilt can be changed without requiring other adjustments to achieve a proper angle and a proper over-all grind to the cutting edge of the cutter elements. For changing this angle of tilt, the clamp bolt and slot connection 52 is simply loosened and the holder 46 repositioned to its new angle of support, wherein the connection 52 may be re-tightened.

By using the adjustable chain holder 46 with structural portions of the grinder shown in my U.S. Pat. No. 4,836,058, precise angular adjustment of the chisel edge can be achieved in combination with precise opposite grinding of the edges E1 and E2. In such grinding, the cutter elements are ground by angling the chain holder on the axial pivot a of its support 42 first in one direction and sharpening all of the cutter elements which face in one direction. Then the holder is angled in the opposite direction and the oppositely directed cutter elements are sharpened.

Precise lateral stop positions of the holder in the two locations are accomplished by adjustable set screw stops 70 on the bed plate.

It is to be understood that the form of my invention herein shown and described is to be taken as a preferred example of the same and that various changes in the shape, size and arrangement of parts may be resorted to without departing from the spirit of the invention or the scope of the subjoined claims.

Having thus described my invention, I claim:

1. A grinding machine for a chisel-bit type saw chain having right and left L-shaped cutter elements, said grinding machine comprising
   a machine base,
   a disc-shaped rotatable grinding wheel having a peripheral grinding edge arranged to sharpen said cutter elements at a grinding point thereon,
   a chain holder mounted on said base having means arranged to hold the chain on a longitudinal surface thereof with the cutter elements adjacent the grinding edge of the grinding wheel,
   said chain holder having a pivot mounting on said base providing grinding both right and left cutter elements at the same grinding point on the grinding wheel,
   said chain holder being adjustable on said base on cross pivot means having a radius of adjustment centered on said grinding point,
   and means engageable with said chain holder for anchoring said holder in a stationary position at selected angles of adjustment to provide a selected angle of grind on cutter elements supported on said longitudinal surface.

2. The grinding machine of claim 1 wherein said chain holder comprises a pair of adjustable plate-like members extending from said base at right angles to said grinding wheel.

3. The grinding machine of claim 2 wherein said adjustable plate-like members have an arcuate slot and clamp fastener connection facilitating releasable clamping adjustment to selected angles of support for a saw chain.

4. The grinding machine of claim 2 wherein said adjustable plate-like members include an arcuate slot and clamp fastener connection, said arcuate slot having its radius centered on said grinding point.

5. The grinding machine of claim 2 including angle indicia on said plate-like members indicating the angle at which said holder is set.

6. The grinding machine of claim 1 wherein said chain holder comprises a first plate-like member secured in upright position at right angles to said grinding wheel, and a second plate-like member disposed in face-to-face relation with said first plate-like member, and an arcuate slot and clamp fastener connection between said plate-like members facilitating releasable clamping adjustment to selected angles of support for a saw chain.

7. The grinding machine of claim 1 wherein the pivotal mounting of said chain holder on said base is on an axis parallel with the axis of said grinding wheel.

8. A grinding machine for a chisel-bit type saw chain having right and left L-shaped cutter elements, said grinding machine comprising
   a machine base,
   a disc-shaped rotatable grinding wheel having a peripheral grinding edge arranged to sharpen said cutter elements at a grinding point thereon, and chain holder means on said base comprising a pair of adjustable plate-like members extending from said base at right angles to said grinding wheel and having an arcuate slot with a radius centered on said grinding point, said plate-like members having clamp fastener connection facilitating releasable clamping adjustment to selected angles of support for a saw chain, said chain holder being arranged top hold cutter elements adjacent the grinding edge of said wheel for sharpening the cutter elements and arranged to support the chain selectively at different angles relative to the grinding wheel for providing a selected sharpened angle to the chisel edge of the cutter elements.

9. The grinding machine of claim 8 including angle indicia on said plate-like member indicating the angle at which said holder means is set.

* * * * *